US005341558A

United States Patent [19]

Varidel et al.

[11] Patent Number: 5,341,558

[45] Date of Patent: Aug. 30, 1994

[54] METHOD OF ASSEMBLING A MOVABLE UPPER TOOL FOR SEPARATING BLANKS

[75] Inventors: Charly Varidel, Le Mont; Marcel Yerly, Jouxtens, both of Switzerland

[73] Assignee: Bobst SA, Lausanne, Switzerland

[21] Appl. No.: 953,938

[22] Filed: Sep. 30, 1992

Related U.S. Application Data

[62] Division of Ser. No. 682,952, Apr. 10, 1991.

[51] Int. Cl.$^5$ .......... B23P 19/02

[52] U.S. Cl. .......... 29/450; 29/469; 52/DIG. 13; 83/696; 225/97

[58] Field of Search .......... 29/419.1, 465, 521, 29/450, 452, 469; 83/657, 686, 687, 691, 696, 138; 108/56.1, 56.3; 24/306; 52/DIG. 13; 269/289 R, 309, 310, 302.1; 248/31 V, 205.2, 363; 428/100; 493/82, 83; 225/97, 103

[56] References Cited

U.S. PATENT DOCUMENTS

| | | | |
|---|---|---|---|
| 1,439,815 | 12/1922 | Haugh | 269/289 R |
| 2,329,345 | 9/1943 | Gardner | 269/309 |
| 2,841,350 | 7/1958 | Chronister | 108/56.3 |
| 3,167,992 | 2/1965 | Kury | 248/363 X |
| 3,391,434 | 7/1968 | Girard | 52/DIG. 13 X |
| 3,398,562 | 8/1968 | Adam | 29/521 X |
| 3,683,735 | 8/1972 | Achier et al. | 83/687 X |
| 3,826,170 | 7/1974 | Jones et al. | 83/657 |
| 3,949,929 | 4/1976 | Kupersmit | 108/56.1 X |
| 4,048,889 | 9/1977 | Finley | 83/138 |
| 4,103,413 | 8/1978 | Malmberg | 29/465 |
| 4,175,686 | 11/1979 | Lang | 225/97 X |
| 4,233,873 | 11/1980 | Jessen | 83/696 X |
| 4,243,166 | 1/1981 | Vossen et al. | 225/97 X |
| 4,489,115 | 12/1984 | Layman et al. | 24/306 X |
| 4,955,940 | 9/1990 | Welleman | 24/306 X |
| 4,974,384 | 12/1990 | Pacione | 52/DIG. 13 X |
| 5,192,011 | 3/1993 | Fuchs | 225/97 |

FOREIGN PATENT DOCUMENTS

| | | |
|---|---|---|
| 0303128 | 2/1989 | European Pat. Off. . |
| WO90/06838 | 6/1990 | World Int. Prop. O. . |
| W091/04139 | 4/1991 | World Int. Prop. O. . |

OTHER PUBLICATIONS

Figures illustrate various usage of Velcro, 1984.

*Primary Examiner*—Peter Dungba Vo
*Attorney, Agent, or Firm*—Hill, Steadman & Simpson

[57] ABSTRACT

A method of assembling a movable upper tool utilizing hook and loop fastening system. The tool used for an upper tool blank separating station has a plate provided with numerous apertures and a lower surface provided with one of a two-layer system of fastening with a first of the two layers having a plurality of loops and a second of the two layers having a plurality of catches or hooks for engaging the loops, and an upper surface of each block at least partially covered with the other of the two layers so that when the block is pressed against the lower surface of the plate, it is mounted thereon.

1 Claim, 1 Drawing Sheet

METHOD OF ASSEMBLING A MOVABLE UPPER TOOL FOR SEPARATING BLANKS

This is a division of application Ser. No. 07/682,952, filed Apr. 10, 1991, now pending.

BACKGROUND OF THE INVENTION

The present invention is concerned with a movable upper tool for a blank separating station situated in a machine for processing sheets to produce blanks for forming packages.

The creation of packages requires three successive steps. The first step is printing of a sheet with numerous motifs or prints, with every one being assigned to one package only. The second step is die-cutting of the sheet into several blanks, with each blank having only one printed motif. The third step or action is folding and gluing every blank so as to obtain a flattened package, which can be subsequently erected and filled with the contents.

After the die-cutting and in order to insure the whole cut sheet to be transferred, generally by means of a gripper bar which is mounted between two parallel extending chains, from the die-cutting station to a station for stripping the waste, which is disposed between the various blanks in the sheet and is not part of the final package, and then finally to a delivery station, all the blanks of the same sheet remain attached together by means of tiny linking points which correspond to tiny non-cutting slots or nicks which are made in the cutting rules of the press.

In the delivery station and according to the requirements, it should be possible to either form a pile of sheets with every one of the sheets having all of its blanks held together by the linking points or to form simultaneously several piles of blanks which have been separated from one another by breaking the linking points when running through a previous section called a blank-separation station.

The prior art blank separating stations use a movable upper tool and fixed lower tool. The upper tool consists of an assembly of blocks and the lower tool of a matrix plate with apertures. The movable blocks will press the blanks through the apertures of the lower matrix and, thus, break the various linking points which connect either the blanks to one another or the margin blanks to a peripheral waste portion of the sheet. The separating tools have to be adapted to the shape and to the layout of the blanks on every new run of sheets to be processed. Generally, the blocks are arranged in a full registry with regard to the cutting lines of the press on the lower side of a plate fitted to a movable upper tool-supporting frame of the blank separating station. A corresponding aperture or mesh of the lower matrix, which may consist of small bars, is situated underneath and opposite every block. The small bars are arranged in such a way as to overlap and form a grid or matrix of which the mesh has the dimensions of the blanks to be separated.

To avoid manufacture of new blank separating tools for every new run of sheets, U.S. Pat. No. 4,175,686, whose disclosure is incorporated herein by reference thereto and which is based on the same Swiss Application which resulted in Swiss Patent A 617,886, proposes to arrange the blocks for shiftable movement in a horizontal direction along bars fitted on a vertical movable frame. The fixed lower grid is composed of crossbars shiftable in such a way as to form a grid of which the meshes are of an adjustable dimension. Although these movable tools have already been simplified for quicker adjustability to a new sheet size, the fitting of the blocks on the inner side of the upper tool, as described in the above-mentioned U.S. Patent, has the drawback of requiring a relatively complex set-up means by the fact that a first stage necessitates the positioning of the blocks on the bars and the second one the interlocking and position of the tools which are to maintain the blocks on the bars. These operations require a rather lengthy time and are fastidious.

Another way of preparing the upper tool consists in gluing the blocks on the lower side of a plate. In such a case, a new upper tool is required for every new process having a sheet of blanks of different sizes or layout.

SUMMARY OF THE INVENTION

The present invention has an object of providing a blank separating device involving none of the above-mentioned drawbacks.

To accomplish these aims, the present invention is directed to a movable upper tool for a blank separating station situated in a sheet processing machine which is used for producing blanks for making packages. The upper tool includes a horizontal plate having a lower surface on which an upper surface of each of the separated blocks is mounted and the improvement is that the plate is provided with numerous apertures arranged in a pattern to allow air to pass through the plate during movement of the plate, the lower surface of the plate being covered at least partially with a layer of a fastening arrangement including a first layer of loops and a second layer of hooks and that the upper surface of each of the blocks is covered at least partially with the other layer of said first and second layers so that the engagement of said first and second layers will insure a securing of the block on the plate. The fastening material is well known and an example is sold under the trademark "VELCRO".

Other advantages and features of the invention will be readily apparent from the following description of the preferred embodiments, the drawings and claims.

DESCRIPTION OF THE PREFERRED EMBODIMENTS

The principles of the present invention are particularly useful when incorporated in an upper tool including a large plate 1, which may be made of wood or any other light material and whose dimensions correspond to the shape of the sheet of blanks which are to be separated from one another by breaking their linking points.

Figure 1:
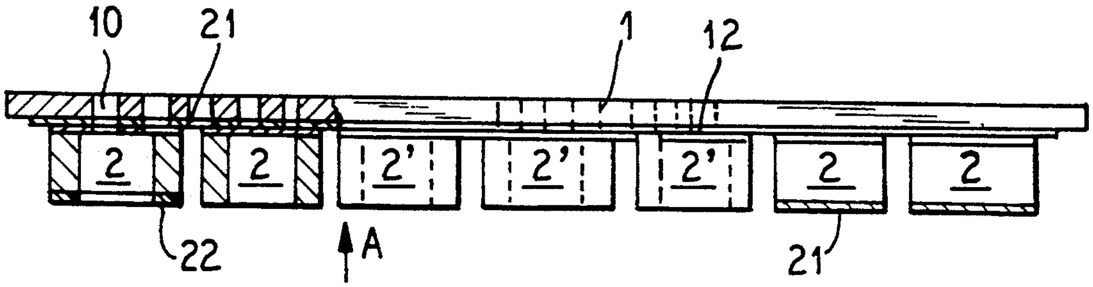
FIG. 1 is a side view with a partial broken out portion taken along lines B—B of FIG. 2 of the upper tool according to the present invention.
Figure 2:
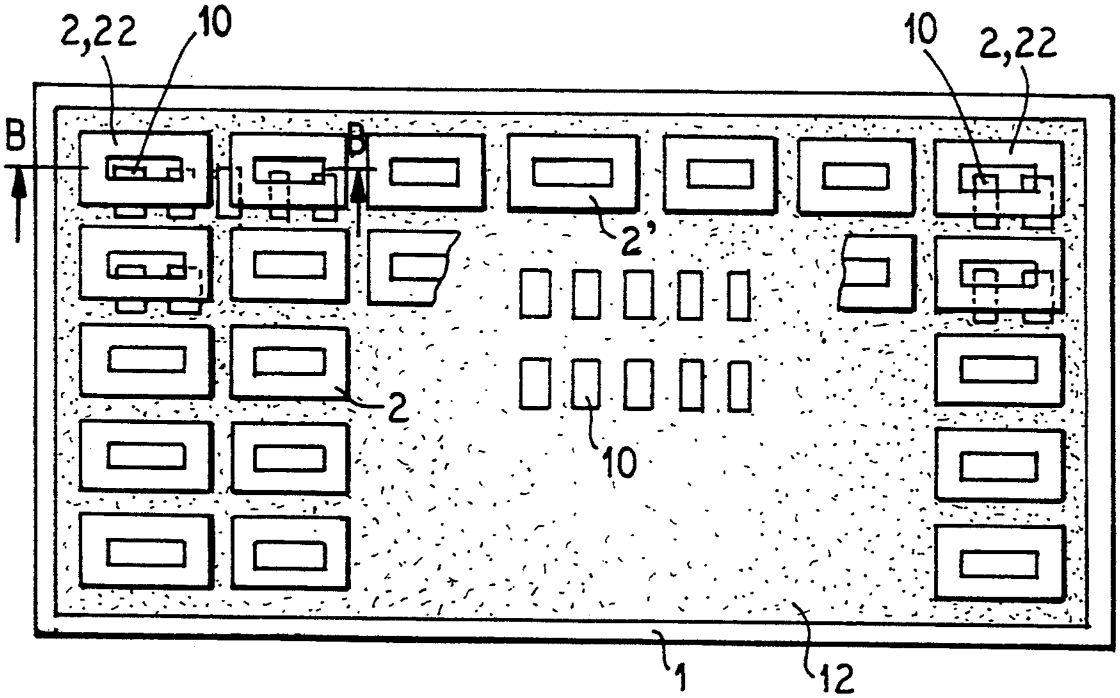
FIG. 2 is a bottom plan view of the upper tool taken in the direction of arrow A of FIG. 1.

The plate 1 is mounted in an already known manner on a movable upper tool-supporting frame in a blank separating station. Approximately the whole side of the plate 1 is provided with a plurality of rectangular apertures 10, which are arranged in rows and columns. These apertures 10 allow the easy movement of the plate during its vertical displacement by allowing air to pass through the plate as the movable upper tool-supporting frame is moved in the vertical direction during processing. Except for the location of each of the apertures 10, nearly the entire lower surface of the plate 1 is covered by a layer 12 which is fastened by gluing or another appropriate manner. The layer 12 is one of the first and second layers of a "VELCRO" fastening system, which includes a first layer of loop-like material which is engageable with a second layer of hook-like materials to form a fastening of the first and second layers together. Numerous wooden blank separating blocks 2 are mounted on the lower surface of the plate 1. Every block 2 is usually shaped as a hollow body and, as illustrated in FIG. 2, have a rectangular configuration. These blocks 2 have an upper surface which is destined to be pressed against the lower surface of the plate 1 and a lower surface which is covered with a foam layer 22, which is designed to contact the blank. Other blocks 2' can also be made out of a resilient polyurethane and are, thus, not provided with the foam layer 22. The upper surface of every block 2 or 2' is covered with two narrow strips 21, 21 (FIG. 3) of the other of the first and second fastening layers that form the VELCRO fastening arrangement.

Figure 3:
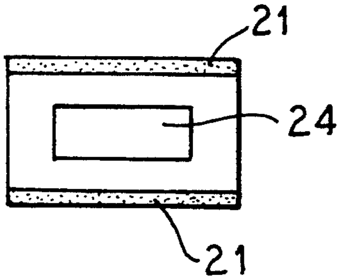
FIG. 3 is a plan view of the arrangement of the fastening strips on one of the blocks.

Tests have proven that it is more appropriate not to cover the whole upper surface of every block 2 or 2' with the VELCRO layer in order to achieve easier positioning and mounting of the blocks. In fact, if the contact surface of the VELCRO layers 12 and 21, which are attributed to each block 2 or 2', were too large, the mounting of the blocks would become extremely awkward. This can be explained by the fact that the ends of the numerous catches or hooks composed in every VELCRO layer requires a lateral shift for a mutual adherence and this shift is only permissible with narrow strips. Moreover, the VELCRO strips 21 are preferably arranged as close as possible to the farthest lateral opposite edges, as illustrated in FIG. 3, so as to enhance the stability of the block when mounted on the plate 1.

It is, of course, possible to envision solid blocks, although it is preferable to use hollow blocks, such as 2 and 2', so as to have openings 24, a portion of which may be aligned with the apertures 10 of the plate 1 and, thus, enable the passage of air during the operation of the tool.

The blocks 2 and 2' are illustrated as having a rectangular shape, however, it is possible that they have other shapes, as desired.

It is also noteworthy to mention that the mounting by means of the VELCRO as described above is especially well adapted to the particular case. In fact, the blocks 2 and 2', when put to work, usually undergo a stress directed only perpendicular to the plate, a direction in which the action of the VELCRO is particularly efficient.

Moreover, both mounting and dismantling of the blocks 2 and 2' with regard to the plate 1 are extremely simplified. In the event the mounting is carried out by a robot, the VELCRO fixing or mounting process is particularly adequate, as there is no need to use fixtures, such as screws or similar devices. In fact, owing to the robot, the mounting of the blocks 2 and 2' is accomplished by a mere positioning of the block 2 or 2' on the plate by the robot and then the robot exerts a strong vertical pressure on the blocks 2 and 2' so as to insure a mutual adherence of the VELCRO layers 12 and 21. As the majority of the blocks 2 and 2' of the tool usually have the same shape and dimension, the robot specialist will immediately become aware of the easier extent by which the VELCRO mounting process will render the preparation of the tool for a new tool size once the way of positioning the blocks 2 and 2' on the plate I is specified and memorized by the robot's control.

Although various minor modifications may be suggested by those versed in the art, it should be understood that we wish to embody within the scope of the patent granted hereon all such modifications as reasonably and properly come within the scope of our contribution to the art.

We claim:

1. A process for preparing a movable upper tool, having a plate with a plurality of position-adjustable blocks thereon, in a selected configuration for separating blanks connected by a perforated line, comprising the steps of:
   - providing a plate and covering a surface of said plate completely with a first layer of a two-layer hook-and-loop fastening system;
   - providing a plurality of blocks and partially covering one surface of each of said blocks with a second layer of said two-layer hook-and-loop fastening system;
   - robotically placing said blocks at respective locations on said plate, with said first and second layers abutting, in a pattern for causing said blanks to separate at said perforation line;
   - pressing said blocks at said locations against said plate to temporarily fix said blocks at said locations by said hook-and-loop fastening system to produce a completed upper tool; and
   - separating said blanks by applying said completed upper tool to said blanks.

* * * * *